United States Patent
Ng et al.

(10) Patent No.: US 8,089,733 B2
(45) Date of Patent: Jan. 3, 2012

(54) HEAD-SLAP MITIGATION IN A DATA STORAGE DEVICE

(75) Inventors: Hwaliang Ng, Singapore (SG); Clifford Jayson B. Camalig, Singapore (SG); Asmin Buang, Singapore (SG)

(73) Assignee: Seagate Technology, Cupertino, CA (US)

( * ) Notice: Subject to any disclaimer, the term of this patent is extended or adjusted under 35 U.S.C. 154(b) by 547 days.

(21) Appl. No.: 12/351,660

(22) Filed: Jan. 9, 2009

(65) Prior Publication Data

US 2010/0177442 A1    Jul. 15, 2010

(51) Int. Cl.
*G11B 5/48* (2006.01)

(52) U.S. Cl. .................. 360/245.7; 360/245.3

(58) Field of Classification Search ............... 360/245.7, 360/245.3, 122, 128, 133
See application file for complete search history.

(56) References Cited

U.S. PATENT DOCUMENTS

| | | | |
|---|---|---|---|
| 5,239,431 A | 8/1993 | Day et al. | |
| 5,640,290 A | 6/1997 | Khanna et al. | |
| 5,657,187 A * | 8/1997 | Hatch et al. | 360/244.8 |
| 5,936,803 A | 8/1999 | Berding | |
| 5,991,122 A * | 11/1999 | Tangren et al. | 360/244.2 |
| 6,373,666 B2 | 4/2002 | Iida et al. | |
| 6,473,270 B1 | 10/2002 | McDonald et al. | |
| 6,738,226 B1 * | 5/2004 | Bhattacharya et al. | 360/245.9 |
| 6,950,282 B2 | 9/2005 | Yim et al. | |
| 7,031,107 B2 | 4/2006 | Kim et al. | |
| 7,136,261 B2 * | 11/2006 | Bhattacharya et al. | 360/244.9 |
| 7,199,969 B2 | 4/2007 | Yoshida | |
| 7,355,812 B2 | 4/2008 | Byun et al. | |
| 2004/0087253 A1 | 5/2004 | Mahadev et al. | |

* cited by examiner

*Primary Examiner* — Gene Auduong

(74) *Attorney, Agent, or Firm* — Braden Katterhelhriel

(57) ABSTRACT

A data storage device comprises a housing, a data storage medium within the housing and a head gimbal assembly including a suspension supporting a read/write head. The read/write head is configured to store and retrieve data on the data storage medium. The read/write head is operably positioned between the data storage medium and the housing. The device further includes a head-lift limiter protruding from the housing that limits a movement of the read/write head in a direction that is substantially orthogonal to the data storage medium.

18 Claims, 3 Drawing Sheets

HEAD-SLAP MITIGATION IN A DATA STORAGE DEVICE

BACKGROUND

Mechanical shock performance under operating and non-operating conditions is an important factor in the reliability of a data storage device design. A data storage device, such as a disc drive, should provide a mechanical shock performance capable of withstanding the rigors of manufacturing, shipping, and operation by an end user. Advances in data storage device capacity have led to data storage devices with more sensitive data storage media and read/write heads, as well as more delicate suspensions and lower fly heights during read and write operations. These changes have made designing data storage devices with suitable mechanical shock performance more difficult.

One phenomenon that can result from a mechanical shock to a data storage device is "head-slap." Head-slap is triggered by a mechanical shock load exceeding a suspension preload, causing a read/write head to lift off the data storage medium. A head-slap event can cause permanent damage to the data storage medium, read/write head, and suspension due to the dynamic impact between the head and the medium when the head springs back towards the disc following the shock event. In addition, a head-slap event can also generate hard particles within the sealed environment of the data storage device, which can further reduce the data storage device's reliability, e.g., when the hard particles crash into sliders or scratch read/write transducers in a read/write head.

SUMMARY

As one example, a data storage device comprises a housing, a data storage medium within the housing and a head gimbal assembly including a suspension supporting a read/write head. The read/write head is configured to store and retrieve data on the data storage medium. The read/write head is operably positioned between the data storage medium and the housing. The device further includes a head-lift limiter protruding from the housing that limits a movement of the read/write head in a direction that is substantially orthogonal to the data storage medium.

These and various other features and advantages will be apparent from a reading of the following detailed description.

DETAILED DESCRIPTION

Limiting the head-lift clearance for read/write heads in a data storage device improves the shock performance of the data storage device. Specifically, limiting the head-lift clearance of the outermost read/write heads, i.e., the top and bottom heads, reduces the likelihood and severity of damage to the data storage device from the occurrence of a shock event. Limiting the head-lift clearance of the outermost read/write heads can be accomplished with protruding features adjacent to the movement path of the outermost read/write heads on the interior of the housing of a data storage device, referred to herein as head lift limiters.

Figure 1:
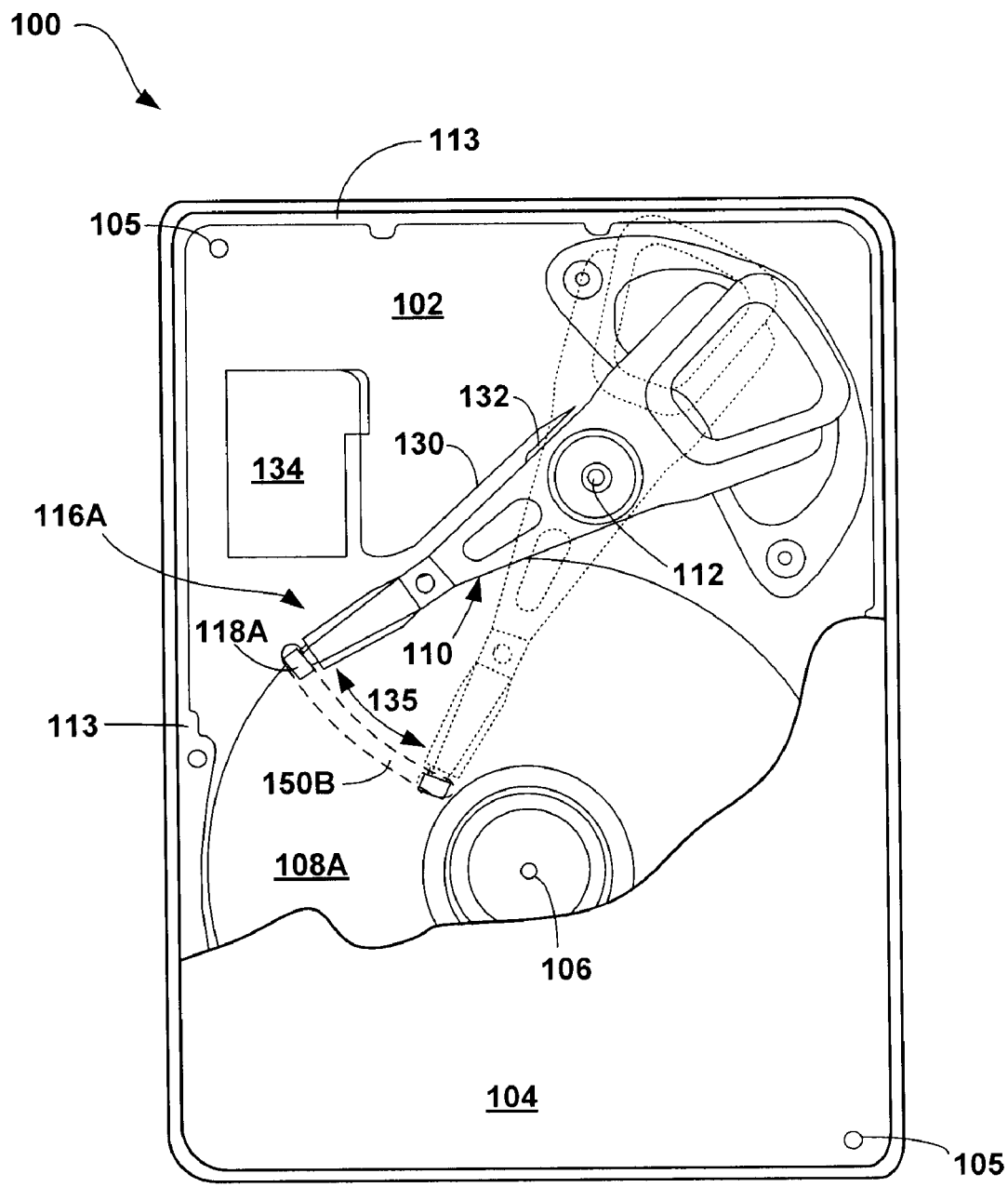
FIG. 1 is a conceptual illustration of an exemplary data storage device including head-lift limiters on the base and top cover of the data storage device.
Figure 2:
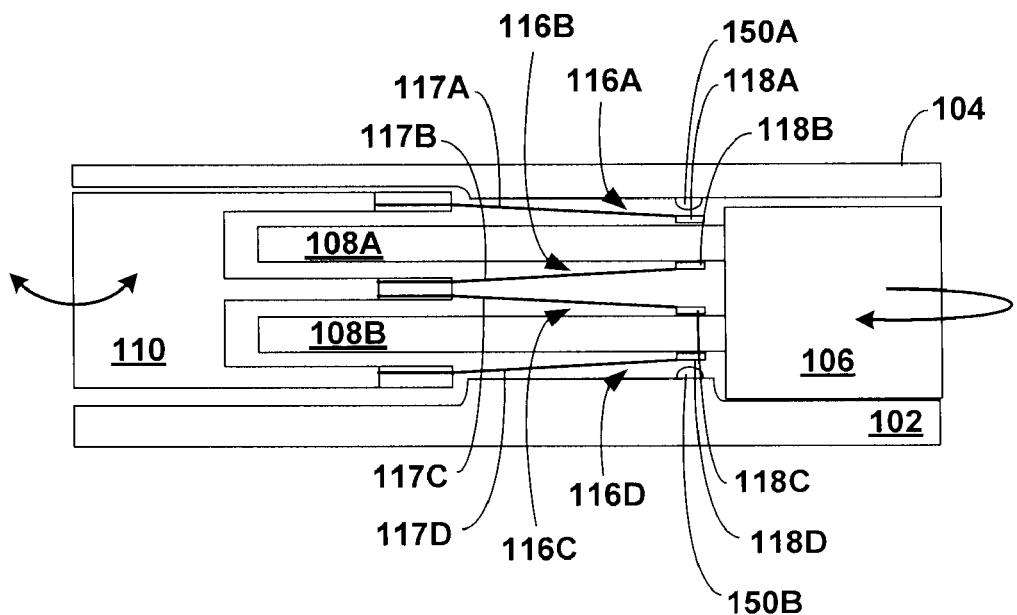
FIGS. 2-3 are cross-sectional views illustrating portions of the exemplary data storage device illustrated in FIG. 1.
Figure 3:
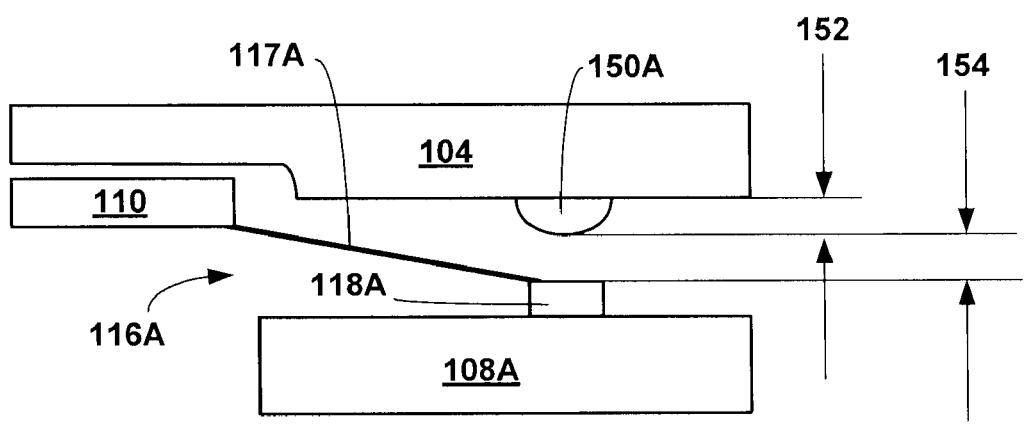

FIGS. 1-3 illustrate an exemplary data storage device 100 that includes head-lift limiter 150A and head-lift limiter 150B (collectively head-lift limiters 150) that limit head-lift clearance for the outermost read/write heads, read/write heads 118A and 118D.

Data storage device 100 includes cover 104, shown partially cut away in FIG. 1, which cooperates with base 102 to form a housing that defines an internal environment of data storage device 100. Cover 104 is attached to base 102 with screws (not shown) in screw holes 105. The interface between base 102 and cover 104 is sealed with gasket 113. For example, gasket 113 may be a form-in-place-gasket (FIPG). One example of a suitable FIPG material is FIPG 1280, which is commercially available from 3M™ of Saint Paul, Minn.

Recordable media discs 108A and 108B (collectively discs 108), spindle motor 106 and head gimbal assemblies (HGAs) 116A-116D (collectively HGAs 116) are each mounted within the housing of data storage device 100. HGAs 116 each include one of suspensions 117A-117D (collectively suspensions 117) and one of read/write heads 118A-118D (collectively heads 118). Heads 118 are supported by suspensions 117. HGAs 116 are mounted to actuator assembly 110, e.g., by a swaging process.

Heads 118 are configured to store and retrieve data on discs 108. During a data transfer operation, spindle motor 106 operates to rotate discs 108. Actuator assembly 110 pivots about bearing shaft assembly 112 moving heads 118 across media tracks of discs 108 along arc 135. Flex assembly 130 provides electrical connection paths to control actuator assembly 110 and allows pivotal movement of actuator assembly 110 during operation. Printed circuit board 132 controls read and write operations of heads 118. Flex assembly 130 terminates at flex bracket 134 for communication to a printed circuit board (not shown).

Head-lift limiters 150 define the head-lift clearance for heads 118A and 118D. As an example, the head-lift clearance for head 118A is shown in FIG. 3 as distance 154. Head-lift limiters 150 protrude from an interior surface of the housing of data storage device 100. More specifically, head-lift limiter 150A protrudes from the interior surface of cover 104, and head-lift limiter 150B protrudes from the interior surface of base 102. As best depicted in FIG. 1 with respect to head-lift limiter 150B, head-lift limiters 150 are adjacent to the movement path of the outermost read/write heads: read/write heads 118A and 118D. In data storage device 100, the movement path of read/write heads 118A and 118D is an arc from the inner diameter to the outer diameter of discs 108. In other data storage devices the outermost read/write heads may have a different movement path, e.g., in data storage devices having an actuator assembly including a four-bar linkage.

It is not necessary for the head-lift limiters to be adjacent to the movement path of the outermost read/write heads as head lift limiters may instead protrude towards a movement path of a portion of the head suspension, such as the suspension of HGAs 116A and 116D, or a combination of movement path of read/write heads and the movement path of a portion of the head suspension in order to limit the head-lift clearance. In this matter, head-lift limiters can be characterized as protruding from an interior surface of the housing adjacent to a movement path of at least a portion of the head gimbal assembly.

The height of head-lift limiters 150 should not interfere with the operation of the adjacent read/write head, i.e., must allow sufficient head-lift clearance for the fly height of the HGA including the read/write head during loading and unloading as well as during data transfer operations. In addition, the tolerances of the components that define the head-lift clearance should also be taken into account to determine a minimum designed head-lift clearance, including to the extent that such tolerances represent stacking tolerances. With respect to data storage device 100, such components include base 102, cover 104, spindle motor 106, HGAs 116A and 116D and head-lift limiters 150. The height of head-lift limiter 150A shown as distance 152, and the head-lift clearance of head 118A is shown as distance 154 in FIG. 3.

Head-lift limiter thickness and head-lift clearances that provide suitable mechanical shock performance will be different in different data storage device designs. As examples only, a head-lift clearance of no greater than about 1.3 millimeters (0.05 inches) may provide a suitable mechanical shock performance. As another example, a head-lift clearance of no greater than about 0.5 millimeters (0.02 inches) may provide a suitable mechanical shock performance. As another example, a head-lift clearance of no greater than about 0.25 millimeters (0.01 inches) may provide a suitable mechanical shock performance. As another example, a head-lift clearance of no greater than about 0.13 millimeters (0.005 inches) may provide a suitable mechanical shock performance. As another example, a head-lift limiter thickness of no greater than about 2.5 millimeters (0.10 inches) may provide a suitable mechanical shock performance.

Head-lift limiters 150 may be integral, meaning they are unitarily constructed preferably of a common material, with the housing of data storage device 100 or may be added on top of the interior surface of the housing of data storage device 100. For example, if head-lift limiters 150 are integral with the housing of data storage device 100, the contour and thickness head-lift limiters 150 may be manufactured as part of the housing of data storage device 100. For example, base 102 and cover 104 may be manufactured using casting, machining, stamping, powder metallurgy, or a combination thereof. The form of head-lift limiters may simply be part of the form of base 102 and cover 104. In this manner, the inclusion of head-lift limiters 150 in the design of data storage device 100 may have a negligible effect on the manufacturing process as well as on the production cost of data storage device 100. Such embodiments may also provide good tolerance control for the height of head-lift limiters 150 as no additional components are necessary for head-lift limiters 150.

Alternatively, head-lift limiters 150 can be added to the interior surface of the housing of data storage device 100. Such embodiments allow the use of elastic materials for head-lift limiters 150. Using elastic materials may provide cushioning for HGAs 116A and 116D to dissipate energy during a shock event in addition to limiting the head-lift clearance of heads 118A and 118D. Suitable elastic materials for head-lift limiters 150 should be low outgasing as head-lift limiters 150 are an internal component of data storage device 100. Suitable elastic materials for head-lift limiters 150 should also facilitate precise height and tolerance control as necessary to precisely control the head-lift clearance.

Exemplary properties of a suitable elastic materials include outgassing of less than 12 microgams per gram (μg/g), about a 45 Shore A hardness, a compression set of less than 25 percent, an Elastic Modulus of about 0.55 Megapascals (MPa) at 24 degrees Celsius (° C.), a glass transition temperature (Tg) of –22° C. or less and an ability to result in an aspect ratio of 1.3 (width/height) for a cured bead. The aspect ratio is dependent on the viscosity and surface tension of an uncured elastic material.

As one example, head-lift limiters 150 can be ultra-violet cured or oven-cured elastic strips deposited with precise height and tolerance control on the inner surfaces of the base 102 and cover 104. As another example, head-lift limiters 150 may be made from the same material as gasket 113 (FIG. 1) such as a FIPG material. One example of a suitable FIPG material is FIPG 1280, which is commercially available from 3M™ of Saint Paul, Minn. Other materials may also be used for head-lift limiters 150, including but not limited to polymers, elastomeric foam, metal and other materials.

The addition of head-lift limiters to the interior surface of the housing can occur without otherwise altering the design of a data storage device. The addition of head lift limiters to a data storage device design can occur without making significant alterations to the production process. For example, if the production process includes one or more FIPG gaskets, head-lift limiters can simply be added as part of the process for forming the FIPGs for a data storage device. In this manner, the shock protection of a data storage device design currently in production can be improved with the addition of head-lift limiters.

Head-lift limiters 150 reduce the likelihood and severity of damage to data storage device 100 from the occurrence of a shock event. Generally, damage to a data storage device caused by head-slap includes damage to data storage media, read/write heads, and suspensions. One technique for evaluating the severity of damage to the data storage device from the occurrence of a shock event is measuring the total surface area of indentation on the data storage medium created by a head-slap resulting from the shock event. This damage is referred to herein as the head-slap damage area.

The head-lift clearance of interior read/write heads, those between two data storage media is limited as two interior read/write heads are positioned in a back-to-back orientation in data storage devices with two-sided data storage media. For example, in data storage device 100, the head-lift clearance of head 118B is limited by the close proximity of head 118C. Likewise the head-lift clearance of head 118C is limited by the close proximity of head 118B. For this reason, it may not be necessary to further limit the head-lift clearance of interior read/write heads, e.g., heads 118B and 118C, in order to improve the shock performance of a data storage device design. Experimental data demonstrates that head-lift limiters, such as head-lift limiters 150, adjacent to the movement path of the outermost read/write heads, e.g., heads 118A and 118D, reduce the likelihood and severity of damage to the data storage device from the occurrence of a shock event for all of the head-medium interfaces, not just the head-medium interfaces for the outermost read/write heads.

The occurrence of head-slap in a data storage device in response to a shock event is a complex phenomenon. One possible explanation for the improvement in head-slap damage area from a shock event at the head-medium interfaces for the interior read/write heads, e.g., heads 118B and 118C, is that potential energy stored during a head-slap in the suspension and actuator arm supporting the outermost read/write heads event is partially distributed to interior read/write heads. This transfer of energy increases the velocity of the impact between the interior read/write heads and the data storage media during a head-slap event. By limiting the head-lift clearance of the outermost read/write heads, e.g., heads 118A and 118D, the maximum head-lift and thus the maximum potential energy that could be stored in the suspension and actuator arm supporting the outermost read/write heads is reduced.

Head-Lift Limiter Design and Testing

A controlled shock generator was used to induce head slap events in disc drives without head-lift limiters. The controlled shock generator applied shocks in a direction that was sustainably perpendicular to a data storage surface of the media discs in the disc drives (the Z-axis). The applied shocks produced acceleration in the disc drives of 250 g. A high-speed camera captured pictures of the head-slap events.

During the controlled Z-axis shock, the heads lifted away from the disc surface and as soon as the transient shock was over, the suspension forces would move the heads back towards the discs with the leading edge of the heads touchdown first followed by the trailing edge. When the slider tilt angle during the landing was large enough, which is proportional to head-lift distance, the corners of the heads would dig into the disc substrate leaving multiple indentations, i.e., leaving head-slap damage.

Following the testing, an optical system was used to inspect the post shock data storage surfaces, and subsequently measure the total area of the indentations on the data storage data storage surface (in the X-Y plane), previously referred to as the head-slap damage area. Preferably, to ensure the long-term reliability of the disc drive, the head slap damage area following a shock event should be zero. The testing indicated that the outermost read-heads were most susceptible to head-slap and resulting head-slap damage.

Following this baseline experiment using disc drives without head-lift limiters, otherwise similar disc drives including head-lift limiters of various height were tested in the same manner. It was determined that by reducing the head-lift clearance by 69 percent (from 0.0241 inches to 0.0074 inches) the resulting head-slap damage area was reduced by 94 percent. It was also determined that the head-slap damage could be completely eliminated by further reducing the head-lift clearance to 0.0071 inches.

The experimental results demonstrate the effectiveness of the head-lift limiters of the present embodiments. It should be noted that the stated values above are relevant only to a particular disc drive design. Head-lift limiter heights and head-lift clearances that provide sufficient shock protection may be different in different data storage device designs. Testing to determine suitable head-lift limiter heights and head-lift clearances could be repeated for different data storage device designs.

Figure 4:
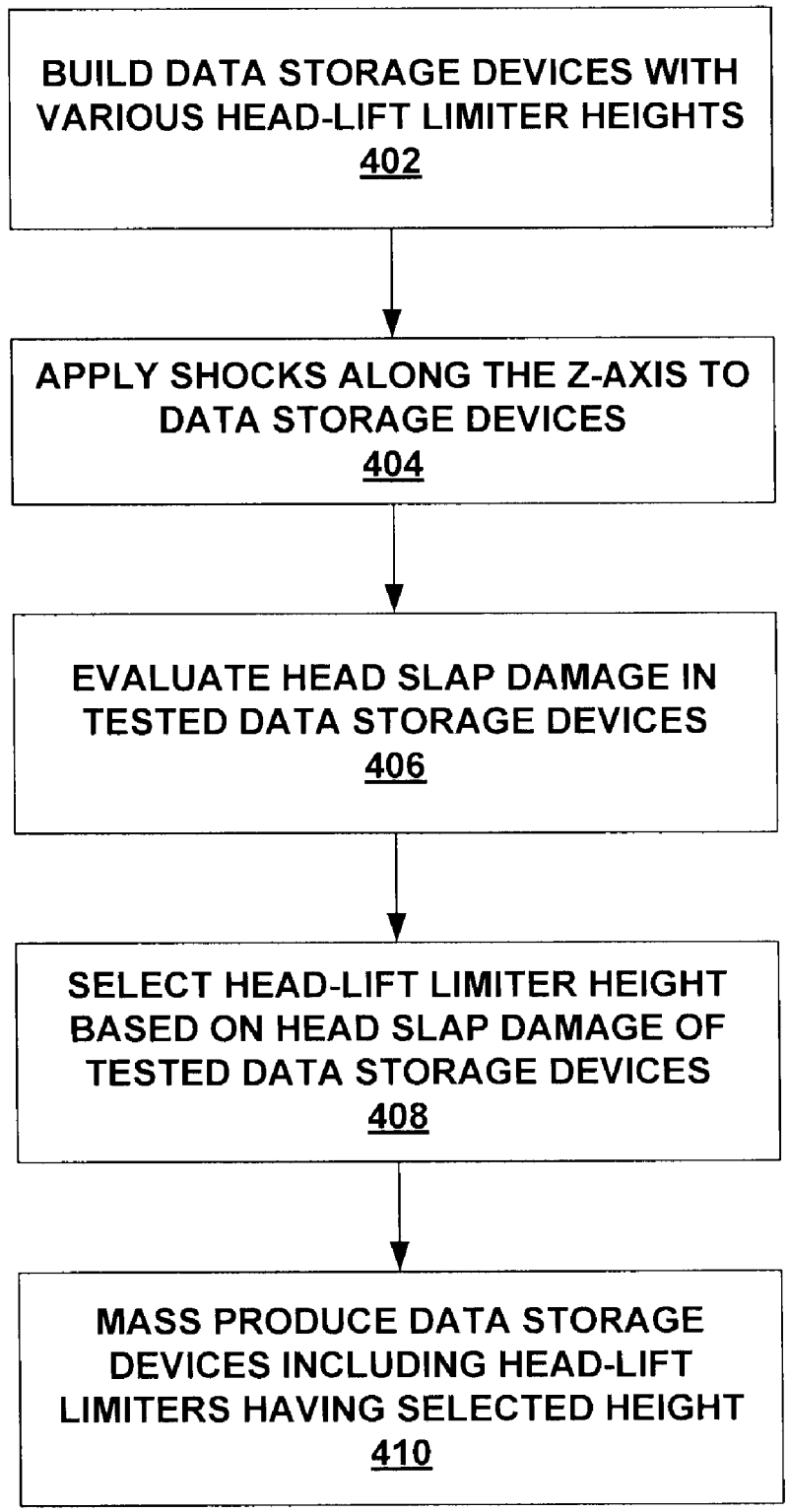
FIG. 4 is a flowchart illustrating techniques for designing head-lift limiters for a data storage device.

FIG. 4 is a flowchart illustrating techniques for designing head-lift limiters for a data storage device. Designing head-lift limiters includes selecting a plurality of head-lift clearance values and building data storage devices with head-lift limiter heights that provide head-lift clearances corresponding to the head-lift clearance values (402). Selecting a plurality of head-lift clearance values may include determining the maximum head-lift limiter height that will not affect the fly-ability of the head and selecting head-lift limiter height no greater than this maximum head-lift limiter height. Stacked tolerances should be taken into account during the selection of the head-lift limiter heights.

Shocks are applied to the data storage devices in a direction that is sustainably perpendicular to a data storage surface in the data storage device (404). Shocks applied in this direction produce the greatest head-slap for a given shock magnitude. Next, the mechanical shock performance of the tested data storage devices is evaluated to correlate head-lift clearance values with mechanical shock performance (406). For example, evaluating the mechanical shock performances may include, measuring head-slap damage area, determining a bit error rate during a data transfer operation rate, searching for bad sectors in the data storage media or any combination thereof.

After evaluating the mechanical shock performances of the tested data storage devices a suitable head-lift limiter height is selected (408). For example, a suitable head-lift limiter height may be the head-lift limiter height corresponding to the tested data storage device that provided the best mechanical shock performance. As another example, a suitable head-lift limiter height may be the minimum head-lift limiter height that met a predetermined mechanical shock performance standard. As an example, a suitable head-lift limiter height may be the minimum head-lift limiter height that sustained a mechanical shock resulting in a desired acceleration without experiencing any detectable damage.

Once the head-lift limiter height is selected, data storage devices similar to those tested may be mass produced with head-lift limiters having the selected head-lift limiter height (410).

The described embodiments may be modified within the spirit of the invention. For example, head-lift clearances that provide suitable shock protection in data storage devices may be implemented using techniques other than head-lift limiters protruding from the interior surface of the housing of a data storage device. For example, the housing itself may be designed such that its interior surface provides head-lift clearances that provide suitable shock protection without the addition of protruding head-lift limiters. As examples, a protruding head-lift limiter may be molded into a base casting for a data storage device or stamped into the top cover of a data storage device.

Other techniques to improve the shock performance of a data storage device may be combined with head-lift clearances that limit head-slap. For example, data storage devices may utilize ramp loading to prevent head-disc contact when the data storage device is non-operational. As another example, data storage devices may include a shock sensor to detect shock events to put the data storage device in a safe mode before damage from the shock event occurs. In addition, data storage media and read/write heads may include coatings that improve durability and wear performance. Other techniques are also possible.

The implementations described above and other implementations are within the scope of the following claims.

The invention claimed is:

1. A data storage device comprising:
   a housing;
   a data storage medium within the housing;
   a head gimbal assembly including a suspension supporting a read/write head, wherein the read/write head is configured to store and retrieve data on the data storage medium, wherein the read/write head is operably positioned between the data storage medium and the housing; and
   a head-lift limiter protruding from the housing that limits a movement of the read/write head in a direction that is substantially orthogonal to the data storage medium.

2. The data storage device of claim 1, wherein the head-lift limiter is sized to limit the orthogonal movement of the read/write head to no greater than about 1.3 millimeters (0.05 inches).

3. The data storage device of claim 1, wherein the head-lift limiter is sized to limit the orthogonal movement of the read/write head to no greater than about 0.5 millimeters (0.02 inches).

4. The data storage device of claim 1, wherein the head-lift limiter has thickness of no greater than about 2.5 millimeters (0.10 inches).

5. The data storage device of claim 1, wherein the head-lift limiter comprises a polymer.

6. The data storage device of claim 1, wherein the head-lift limiter comprises a form-in place gasket (FIPG) material.

7. The data storage device of claim 1, wherein the head-lift limiter and the housing are unitarily constructed of a common material.

8. The data storage device of claim 1, wherein the head-lift limiter is a first head-lift limiter, the data storage device further comprising a second head-lift limiter, wherein the first and second head-lift limiters operably positioned adjacent respective outermost surfaces of one or more data storage mediums.

9. The data storage device of claim 8, wherein the first head-lift limiter protrudes from a base member and wherein the second head-lift limiter protrudes from a cover member.

10. The data storage device of claim 8, wherein the first and second head-lift limiters are sized to limit orthogonal movement relative to the data storage medium of the read/write heads to no greater than about 0.5 millimeters (0.02 inches).

11. The data storage device of claim 1, wherein the data storage medium is selected from a group consisting of:
   a rewriteable medium;
   a write-once-read-many (WORM) medium;
   a magnetic medium;
   a rewriteable magnetic medium;
   one or more data storage discs;
   one or more magnetic discs; and
   one or more rewriteable magnetic data storage discs.

12. A method comprising:
   selecting a plurality of head-lift clearance values;
   providing a plurality of devices, each of the plurality of devices comprising:
      a housing;
      a data storage medium within the housing; and
      a head gimbal assembly including a suspension supporting a read/write head, wherein the read/write head is operably positioned between the data storage medium and the housing, wherein the head-lift clearance values each correspond to an extent to which the read/write head can be displaced in a direction that is substantially orthogonal to the data storage medium; and
   evaluating a mechanical shock performance of each of the plurality of devices by correlating head-lift clearance values to observed damage to the data storage mediums.

13. The method of claim 12, wherein evaluating the mechanical shock performance includes:
   delivering one or more mechanical shocks to each of the plurality of devices; and
   measuring respective head-slap damage area in each of the plurality of devices.

14. The method of claim 12, wherein evaluating the mechanical shock performance includes:
   delivering one or more mechanical shocks to each of the plurality of devices;
   operating the plurality of devices after delivering the mechanical shocks; and
   performing at least one step selected from a group consisting of:
      searching for bad sectors on the data storage medium; and
      determining a bit error rate during a data transfer operation.

15. The method of claim 12, wherein at least some of the data storage devices include a head-lift limiter protruding from an interior surface of the housing limiting the orthogonal movement of at least a portion of the head gimbal assembly to define the head-lift clearance for the read/write head.

16. The method of claim 15, wherein selecting the set of head-lift clearance values includes selecting a set of head-lift limiter thicknesses.

17. The method of claim 15, wherein the head-lift limiters have thickness within a range of about 0.8 millimeters (0.03 inches) to about 2.5 millimeters (0.10 inches).

18. The method of claim 12, wherein evaluating the mechanical shock performance includes delivering one or more mechanical shocks to each of the plurality of devices, wherein the shocks are applied in a direction that is about perpendicular to the outermost data storage surface.

* * * * *